(12) United States Patent
Khamphilavong et al.

(10) Patent No.: US 10,373,741 B2
(45) Date of Patent: Aug. 6, 2019

(54) ELECTRICAL CABLE

(71) Applicant: TE CONNECTIVITY CORPORATION, Berwyn, PA (US)

(72) Inventors: Malai Hongthong Khamphilavong, Woodburn, OR (US); Yevgeniy Mayevskiy, Newberg, OR (US)

(73) Assignee: CREGANNA UNLIMITED COMPANY, Galway (IE)

( * ) Notice: Subject to any disclaimer, the term of this patent is extended or adjusted under 35 U.S.C. 154(b) by 0 days.

(21) Appl. No.: 15/591,579

(22) Filed: May 10, 2017

(65) Prior Publication Data
US 2018/0330848 A1    Nov. 15, 2018

(51) Int. Cl.
| | | |
|---|---|---|
| H01B 7/18 | (2006.01) | |
| H04N 7/10 | (2006.01) | |
| H04N 7/18 | (2006.01) | |
| H01B 11/00 | (2006.01) | |
| H01B 11/10 | (2006.01) | |
| H01B 11/18 | (2006.01) | |
| H01B 11/20 | (2006.01) | |
| H04N 5/225 | (2006.01) | |

(52) U.S. Cl.
CPC ..... *H01B 11/1033* (2013.01); *H01B 11/1878* (2013.01); *H04N 5/2257* (2013.01); *H04N 7/10* (2013.01); *H01B 7/189* (2013.01); *H01B 11/002* (2013.01); *H01B 11/20* (2013.01); *H04N 7/183* (2013.01); *H04N 2005/2255* (2013.01)

(58) Field of Classification Search
None
See application file for complete search history.

(56) References Cited

U.S. PATENT DOCUMENTS

| | | | | |
|---|---|---|---|---|
| 3,973,385 A | * | 8/1976 | Roe | B29C 47/027 174/113 R |
| 4,010,619 A | * | 3/1977 | Hightower | B63C 11/48 114/322 |
| 4,408,089 A | * | 10/1983 | Nixon | H01B 11/1033 174/106 R |
| 4,500,748 A | * | 2/1985 | Klein | C08K 3/00 174/121 A |
| 4,642,417 A | * | 2/1987 | Ruthrof | H01B 11/1033 174/105 R |
| 4,697,051 A | * | 9/1987 | Beggs | H01B 11/02 174/34 |
| 4,755,629 A | * | 7/1988 | Beggs | H01B 11/02 174/115 |

(Continued)

*Primary Examiner* — Chau N Nguyen
*Assistant Examiner* — Muhammed Azam

(57) ABSTRACT

An electrical cable includes a first conductor assembly having a first inner conductor and a first insulator engaging and surrounding a surface of the first inner conductor and a second conductor assembly having a second inner conductor and a second insulator engaging and surrounding a surface of the second inner conductor. The electrical cable includes a non-conductive buffer layer surrounding the conductor assemblies having an inner surface engaging the insulators and a conductive shield layer engaging and surrounding an outer surface of the non-conductive buffer layer and providing electrical shielding for the conductor assemblies. An outer jacket engages and surrounds the conductive shield layer.

15 Claims, 2 Drawing Sheets

(56) References Cited

U.S. PATENT DOCUMENTS

| | | | | |
|---|---|---|---|---|
| 4,761,519 A | * | 8/1988 | Olson | H01B 7/041 156/51 |
| 4,831,456 A | * | 5/1989 | Takamura | A61B 1/05 348/294 |
| 5,000,539 A | * | 3/1991 | Gareis | G02B 6/4483 174/70 R |
| 5,001,304 A | * | 3/1991 | Hardin | G02B 6/443 174/107 |
| 5,010,210 A | * | 4/1991 | Sidi | H01B 11/02 174/113 R |
| 5,043,530 A | * | 8/1991 | Davies | H01B 7/1895 174/102 R |
| 5,103,067 A | * | 4/1992 | Aldissi | H01B 11/1033 174/107 |
| 5,140,662 A | * | 8/1992 | Kumar | G02B 6/3887 385/81 |
| 5,149,915 A | * | 9/1992 | Brunker | H01B 11/08 174/105 R |
| 5,253,317 A | * | 10/1993 | Allen | G02B 6/443 174/107 |
| 5,298,680 A | * | 3/1994 | Kenny | H01B 11/04 174/34 |
| 5,326,638 A | * | 7/1994 | Mottine, Jr. | C08K 5/005 174/110 R |
| 5,491,299 A | * | 2/1996 | Naylor | A61B 5/04286 174/105 R |
| 5,493,071 A | * | 2/1996 | Newmoyer | H01B 7/295 174/110 FC |
| 5,502,287 A | * | 3/1996 | Nguyen | H01B 7/0838 156/53 |
| 5,519,173 A | * | 5/1996 | Newmoyer | H01B 11/02 156/51 |
| 5,543,831 A | * | 8/1996 | Tsuji | H04N 7/183 128/901 |
| 5,739,473 A | * | 4/1998 | Zerbs | H01B 11/02 174/110 PM |
| 5,777,273 A | * | 7/1998 | Woody | H01B 9/003 174/113 R |
| 5,814,768 A | * | 9/1998 | Wessels | H01B 11/02 174/110 FC |
| 5,841,073 A | * | 11/1998 | Randa | H01B 7/295 174/113 R |
| 5,917,977 A | * | 6/1999 | Barrett | G02B 6/4416 385/100 |
| 5,930,431 A | * | 7/1999 | Lail | G02B 6/4494 385/100 |
| 5,956,445 A | * | 9/1999 | Deitz, Sr. | G02B 6/441 174/24 |
| 6,025,873 A | * | 2/2000 | Nishioka | A61B 1/00195 348/342 |
| 6,049,647 A | * | 4/2000 | Register | G02B 6/4416 385/100 |
| 6,153,826 A | * | 11/2000 | Kenny | H01B 11/02 174/113 R |
| 6,288,340 B1 | * | 9/2001 | Arnould | H01B 13/2673 174/113 R |
| 6,310,286 B1 | * | 10/2001 | Troxel | H01B 9/003 174/102 R |
| 6,432,046 B1 | * | 8/2002 | Yarush | A61B 1/00039 600/109 |
| 6,448,500 B1 | * | 9/2002 | Hosaka | H01B 9/003 174/113 R |
| 6,452,107 B1 | * | 9/2002 | Kebabjian | H01B 11/002 174/113 R |
| 6,453,097 B1 | * | 9/2002 | Newton | G02B 6/4402 385/102 |
| 6,501,027 B1 | * | 12/2002 | Belli | H01B 7/189 174/110 F |
| 6,503,195 B1 | * | 1/2003 | Keller | A61B 1/00163 348/45 |
| 6,506,976 B1 | * | 1/2003 | Neveux, Jr. | H01B 11/06 174/113 C |
| 7,015,397 B2 | * | 3/2006 | Clark | H01B 11/04 174/113 R |
| 7,030,321 B2 | * | 4/2006 | Clark | H01B 11/02 174/113 R |
| 7,208,683 B2 | * | 4/2007 | Clark | H01B 11/04 174/110 R |
| 7,405,360 B2 | * | 7/2008 | Clark | H01B 11/06 174/113 AS |
| 7,795,539 B2 | * | 9/2010 | Thuot | H01B 7/0275 174/110 R |
| 7,834,271 B2 | * | 11/2010 | Gromko | H01B 11/085 174/113 AS |
| 8,798,419 B2 | * | 8/2014 | Wessels, Jr. | H01B 11/125 385/113 |
| 8,859,902 B2 | * | 10/2014 | Matsuda | H01B 11/002 174/102 R |
| 2001/0052930 A1 | * | 12/2001 | Adair | A61B 1/00016 348/65 |
| 2002/0164133 A1 | * | 11/2002 | Rattazzi | G02B 6/4482 385/100 |
| 2003/0070831 A1 | * | 4/2003 | Hudson | H01B 7/295 174/113 R |
| 2010/0261961 A1 | * | 10/2010 | Scott | A61B 1/00193 600/111 |
| 2011/0034769 A1 | * | 2/2011 | Adair | H04N 5/3765 600/110 |
| 2011/0127064 A1 | * | 6/2011 | Rivernider, Jr. | H01B 11/1033 174/106 R |
| 2013/0168149 A1 | * | 7/2013 | Gundel | H01B 7/0861 174/350 |
| 2013/0299211 A1 | * | 11/2013 | Pope | H01B 7/1865 174/113 R |
| 2014/0251651 A1 | * | 9/2014 | Huang | A61B 8/44 174/34 |
| 2015/0096785 A1 | * | 4/2015 | Hayashishita | H01B 3/445 174/113 R |

* cited by examiner

ELECTRICAL CABLE

BACKGROUND OF THE INVENTION

The subject matter herein relates generally to electrical cables that provide shielding around signal conductors.

Electrical cables are used in high-speed data transmission applications, such as for high definition video transmission. For example, electrical cables may be used in a video endoscope device for video endoscopy. Some electrical cables use twisted pairs for high speed digital signal propagation. For quality signal integrity, the signal path needs adequate bandwidth as higher bandwidth allows for faster data rates. In some applications, electromagnetic interference (EMI) and/or radio frequency interference (RFI) are concerns so the electrical cables are shielded to protect against interference from environmental sources of EMI/RFI. However, in shielded twisted pair designs, the shield often limits the performance of the electrical cable as the shield in general degrades the bandwidth of the supported signal by introducing additional attenuation.

To reduce the negative impact of the shield on the signal transmission, some cable designs increase the thickness of the insulator surrounding the signal conductors. However, increasing the thickness of the insulator increases the overall diameter of the cable. Additionally, the material of the insulator may be relatively rigid, making the cable less flexible as the thickness of the insulator is increased.

A need remains for an electrical cable having improved mechanical and electrical performance.

BRIEF DESCRIPTION OF THE INVENTION

In an embodiment, an electrical cable is provided including a first conductor assembly and a second conductor assembly that extend along a length of the electrical cable. The first conductor assembly includes a first inner conductor and a first insulator engaging and surrounding a surface of the first inner conductor. The second conductor assembly includes a second inner conductor and a second insulator engaging and surrounding a surface of the second inner conductor. The electrical cable includes a non-conductive, low dielectric loss, buffer layer surrounding the first and second conductor assemblies having an inner surface engaging the first and second insulators and an outer surface opposite the inner surface. The electrical cable includes a conductive shield layer engaging and surrounding the outer surface of the non-conductive buffer layer and providing electrical shielding for the first and second conductor assemblies. The electrical cable includes an outer jacket engaging and surrounding the conductive shield layer.

In another embodiment, an electrical cable is provided including a first conductor assembly and a second conductor assembly that extend along a length of the electrical cable. The first conductor assembly includes a first inner conductor and a first insulator engaging and surrounding a surface of the first inner conductor. The second conductor assembly includes a second inner conductor and a second insulator engaging and surrounding a surface of the second inner conductor. The electrical cable includes a non-conductive low dielectric loss, buffer layer surrounding the first and second conductor assemblies. The non-conductive buffer layer includes braided strands of non-conductive material. The non-conductive buffer layer has an inner surface engaging the first and second insulators and an outer surface opposite the inner surface. The electrical cable includes a conductive shield layer engaging and surrounding the outer surface of the non-conductive buffer layer. The conductive shield layer includes braided strands of conductive material and provides electrical shielding for the first and second conductor assemblies. The electrical cable includes an outer jacket engaging and surrounding the conductive shield layer.

In a further embodiment, an electrical cable is provided for a video endoscope device having a camera and a display that includes a first conductor assembly that extends along a length of the electrical cable configured to be electrically connected to the camera and the display. The first conductor assembly includes a first inner conductor and a first insulator engaging and surrounding a surface of the first inner conductor. The electrical cable includes a second conductor assembly adjacent the first conductor assembly along the length of the electrical cable configured to be electrically connected to the camera and the display. The second conductor assembly includes a second inner conductor and a second insulator engaging and surrounding a surface of the second inner conductor. The electrical cable includes a non-conductive low dielectric loss, buffer layer surrounding the first and second conductor assemblies having an inner surface engaging the first and second insulators and an outer surface opposite the inner surface. The electrical cable includes a conductive shield layer engaging and surrounding the outer surface of the non-conductive buffer layer and providing electrical shielding for the first and second conductor assemblies. The electrical cable includes an outer jacket engaging and surrounding the conductive shield layer.

DETAILED DESCRIPTION OF THE INVENTION

Figure 1:
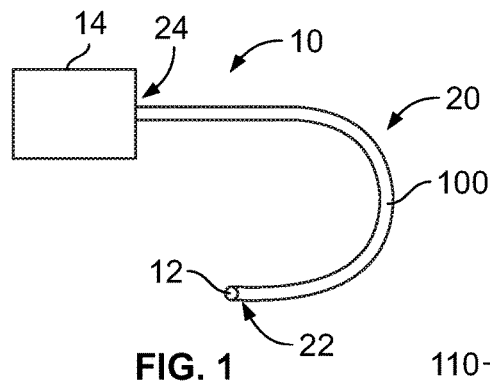
FIG. 1 is a schematic view of a system using an electrical cable formed in accordance with an embodiment to connect a first component and a second component.

FIG. 1 is a schematic view of a system 10 using an electrical cable 100 formed in accordance with an embodiment to connect a first component 12 and a second component 14. The electrical cable 100 may be used for high speed data transmission between the first and second components 12, 14. The electrical cable 100 may be used as a high-frequency signal transmitter. The electrical cable 100 provides electrical shielding for the data transmission lines between the first and second components 12, 14.

In the illustrated embodiment, the system 10 includes a video endoscope device 20 with the electrical cable 100 connected between a camera 12 defining the first component 12 at a first end 22 of the electrical cable 100 and a display 14 defining the second component 14 and a second end 24 of the electrical cable 100. The video endoscope device 20 may include other components in alternative embodiments. The electrical cable 100 may be used to transmit video signals, such as in medical imaging applications for surgical endoscopy. In other various embodiments, the electrical cable 100 may be used with other types of devices and is not intended to be limited to the video endoscope device 20. For example, the electrical cable 100 may be used in a data communication application, such as electrical switches, routers, and/or host bus adapters.

Figure 2:
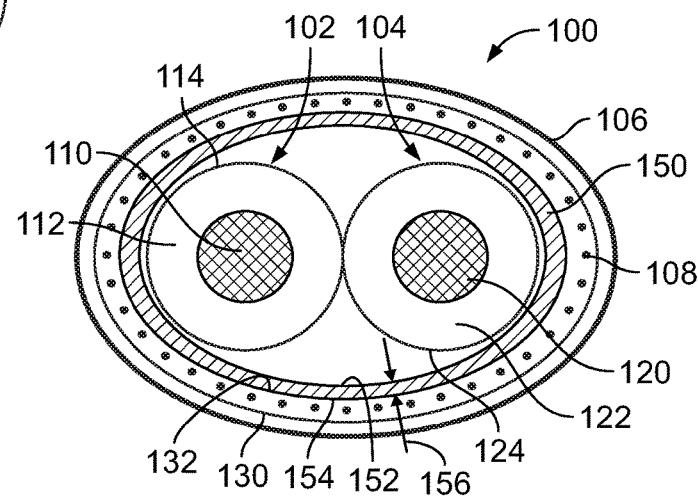
FIG. 2 is a cross-sectional view of the electrical cable in accordance with an exemplary embodiment.
Figure 3:
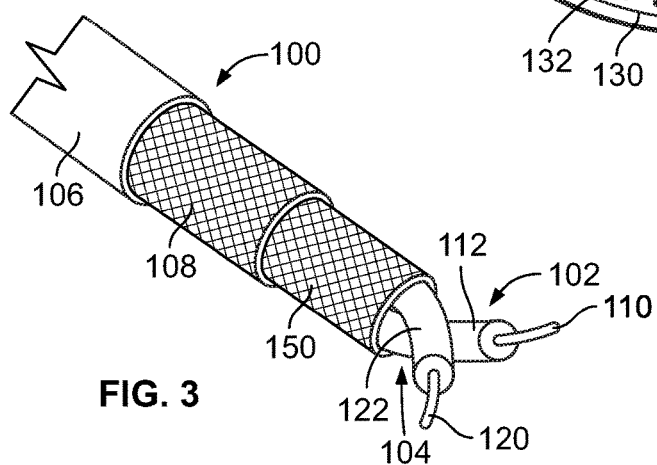
FIG. 3 is a perspective view of the electrical cable sectioned to show various elements of the electrical cable.

FIG. 2 is a cross-sectional view of the electrical cable 100 in accordance with an exemplary embodiment. FIG. 3 is a perspective view of the electrical cable 100 sectioned to show various elements of the electrical cable 100. The electrical cable 100 includes at least one conductor assembly, such as a first conductor assembly 102 and a second conductor assembly 104 as in the illustrated embodiment. In an exemplary embodiment, the conductor assemblies 102, 104 form a twisted pair where the conductor assemblies 102, 104 are twisted or wound helically around each other along the length of the electrical cable 100.

The conductor assemblies 102, 104 are held in a core of the electrical cable 100 within an outer jacket 106. The outer jacket 106 surrounds the conductor assemblies 102, 104 along the length of the electrical cable 100. In FIG. 3, the conductor assemblies 102, 104 are shown protruding from the outer jacket 106 for clarity in order to illustrate the various components of the electrical cable 100 that would otherwise be obstructed by the outer jacket 106. It is recognized, however, that the outer jacket 106 may be stripped away from the conductor assemblies 102, 104 at or both ends 22, 24 of the electrical cable 100, for example, to allow for the conductor assemblies 102, 104 to terminate to the components 12, 14.

In an exemplary embodiment, the electrical cable 100 includes a conductive shield layer 108 inside the outer jacket 106 that provides electrical shielding for the conductor assemblies 102, 104. In an exemplary embodiment, the electrical cable 100 includes a non-conductive buffer layer 150 between the conductive shield layer 108 and the conductor assemblies 102, 104. For example, the non-conductive buffer layer 150 surrounds the first and second conductor assemblies 102, 104 and provides a buffer between the conductor assemblies 102, 104 and the conductive shield layer 108, such as to control spacing between the conductor assemblies 102, 104 and the conductive shield layer 108 and/or to control an impedance of the electrical cable 100. The shield layer 108 is electromagnetically coupled to the first and second conductor assemblies 102, 104 through the non-conductive buffer layer 150.

The outer jacket 106 is formed of at least one dielectric material, such as one or more polymers (for example, polyethylene, polypropylene, polytetrafluoroethylene, or the like). The outer jacket 106 is not conductive, and is used to insulate the shield layer 108 from objects outside of the electrical cable 100. The outer jacket 106 also protects the shield layer 108 and the other internal components of the electrical cable 100 from mechanical forces, contaminants, and elements (such as fluctuating temperature and humidity). Optionally, the outer jacket 106 may be extruded or otherwise molded around the shield layer 108. Alternatively, the outer jacket 106 may be wrapped around the shield layer 108 or heat shrunk around the shield layer 108.

The first conductor assembly 102 includes a first inner conductor 110 that is configured to convey data signals, such as video signals and a first insulator 112 surrounding the first inner conductor 110. The inner conductor 110 and insulator 112 extend longitudinally along the length of the electrical cable 100. The inner conductor 110 is formed of a conductive material, such as metal. The inner conductor 110 may be solid or composed of a combination of multiple strands wound together. The insulator 112 engages and surrounds a surface 114 of the inner conductor 110. As used herein, two components are in "engagement" when there is direct physical contact between the two components. The insulator 112 is formed of a dielectric material, such as fluorinated ethylene propylene (FEP) for example. The insulator 112 may be extruded with the first inner conductor 110. The insulator 112 is configured to maintain separation between the inner conductor 110 and other components, such as a shield of the electrical cable 100 or from the conductor of the second conductor assembly 104 to electrically insulate the inner conductor 110 preventing an electrical short. The size and/or shape of the inner conductor 110, the size and/or shape of the insulator 112, and the relative positions of the inner conductor 110 and the insulator 112 may be modified or selected in order to attain a particular impedance for the electrical cable 100.

The second conductor assembly 104 includes a second inner conductor 120 that is configured to convey data signals, such as video signals and a second insulator 122 surrounding the second inner conductor 120. The inner conductor 120 and insulator 122 extend longitudinally along the length of the electrical cable 100. The inner conductor 120 is formed of a conductive material, such as metal. The inner conductor 120 may be solid or composed of a combination of multiple strands wound together. The insulator 122 engages and surrounds a surface 124 of the inner conductor 120. The insulator 122 is formed of a dielectric material. The insulator 122 is configured to maintain separation between the inner conductor 120 and other components, such as a shield of the electrical cable 100 or from the first inner conductor 110 of the first conductor assembly 102 to electrically insulate the inner conductor 120 preventing an electrical short. The size and/or shape of the inner conductor 120, the size and/or shape of the insulator 122, and the relative positions of the inner conductor 120 and the insulator 122 may be modified or selected in order to attain a particular impedance for the electrical cable 100. Optionally, the size and/or shape of the inner conductors 110, 120 may be identical and the size and/or shape of the insulators 112, 122 may be identical. In other various embodiments, the first and second insulators 122 may be integral, such as being co-molded around the inner conductors 110, 120.

The first and second insulators 112 are surrounded by the non-conductive buffer layer 150 and the conductive shield layer 108. The conductive shield layer 108 is formed of a conductive material, such as a metal material. In an exemplary embodiment, the conductive shield layer 108 is a braided shield including braided strands of conductive material. For example, the shield layer 108 may include silver plated copper braided strands. The braided strands wrap helically around the core of the electrical cable 100. The conductive shield layer 108 is configured to provide electrical shielding for the pair of conductor assemblies 102, 104 from external sources of EMI/RFI interference. The conductive shield layer 108 is configured to provide flexibility for the electrical cable 100, allowing the electrical cable 100 to bend and flex while maintaining shielding integrity. Other types of shields may be provided in alternative embodiments, such as conductive foils wrapped helically around the core of the electrical cable 100.

The outer jacket 106 surrounds and engages an outer surface 130 of the shield layer 108. In the illustrated embodiment, the outer jacket 106 engages the shield layer 108 along substantially the entire periphery of the shield layer 108. An inner surface 132 of the shield layer 108 surrounds and engages the non-conductive buffer layer 150. The inner surface 132 may engage the non-conductive buffer layer 150 along substantially the entire periphery of the non-conductive buffer layer 150. In an embodiment, the cross-sectional shape of the shield layer 108 may be geometrically similar to the cross-sectional shape of the non-conductive buffer layer 150. The term "geometrically similar" is used to mean that two objects have the same shape, although different sizes, such that one object is a scaled relative to the other object. For example, as shown in FIG. 2, the shield layer 108 has a generally circular shape along the cross-section and the non-conductive buffer layer 150 has a generally circular shape along the cross-section; however, other shapes are possible in alternative embodiments, such as an elliptical or oval shape along the cross-section The non-conductive buffer layer 150 has an inner surface 152 and an outer surface 154. The inner surface 152 engages and surrounds the first and second insulators 112, 122 of the first and second conductor assemblies 102, 104. The outer surface 154 is opposite the inner surface 152 and faces the inner surface 132 of the shield layer 108. The non-conductive buffer layer 150 is formed of a non-conductive material, such as a polymer material. The non-conductive buffer layer 150 provides a layer of insulation having a low dielectric constant between the conductor assemblies 102, 104 and the shield layer 108. In various embodiments, the non-conductive buffer layer 150 is manufactured from an aromatic polymer material, such as an aromatic polyamide material, an aromatic polyester material, and the like. The non-conductive buffer layer 150 may be manufactured from a poly paraphenylene terephthalamide material such as or similar to Kevlar®, an aliphatic or semi-aromatic polyamide such as or similar to nylon, a melt spun liquid crystal polymer such as or similar to Vectran®, and the like.

In an exemplary embodiment, the non-conductive buffer layer 150 is a braided layer including braided strands of non-conductive material. Braiding of the non-conductive buffer layer 150 may increase the mechanical strength of the buffer layer 150. The non-conductive strands are braided around the core of the electrical cable 100 and may wrap helically around the core. The non-conductive buffer layer 150 may be porous to air. For example, air may be present between and around the various braided strands. As such, air dielectric is present around the first and second insulators 112, 122, which may affect the dielectric constant of the electrical cable 100 and the impedance of the electrical cable 100. In an exemplary embodiment, the non-conductive buffer layer 150 has M number of picks of braided strands of non-conductive material and the conductive shield layer 108 has N number of picks of braided strands of conductive material different than the M number of picks of braided strands of non-conductive material. For example, the non-conductive buffer layer 150 may have between approximately 15 and 30 picks of braided strands of non-conductive material and the conductive shield layer 108 may have between approximately 20 and 40 picks of braided strands of conductive material. In an exemplary embodiment, the non-conductive buffer layer 150 may have approximately 20 picks of braided strands of non-conductive material and the conductive shield layer 108 may have approximately 25 picks of braided strands of conductive material. The number of picks of braided strands may affect the flexibility of the layers, the pull strength of the layers, the shield effectiveness of the conductive shield layer 108, the dielectric constant of the non-conductive buffer layer 150, and the like. Other types of buffer layers may be provided in alternative embodiments, such as non-conductive tapes or foils wrapped helically around the core of the electrical cable 100 and/or non-conductive fillers.

The non-conductive buffer layer 150, in an embodiment, has a uniform radial thickness 156 between the inner surface 152 and the outer surface 154. The radial thickness 156 controls the positioning of the shield layer 108 relative to the first and second conductor assemblies 102, 104. By having a uniform radial thickness, the shield layer 108 is positioned a constant radial distance from the inner conductors 110, 120 to provide consistent electrical properties along the length of the electrical cable 100. For example, the distance from the inner conductor 110 to the shield layer 108 at any location along the length may be approximately equal to the distance from the inner conductor 120 to the shield layer 108 at any location along the length. Providing a uniform radial thickness 156 controls relative positions of the shield layer 108 and the conductor assemblies 102, 104 to support the signal integrity by reducing attenuation due to irregularities and/or discontinuities in the electrical shielding. In an exemplary embodiment, the radial thickness 156 is significantly less than a radial thickness of the insulator 112 or the insulator 122, such as less than half the radial thickness of the insulator 112 or the insulator 122 such that the non-conductive buffer layer 150 has minimal impact on the overall diameter of the electrical cable 100.

In an exemplary embodiment, the non-conductive buffer layer 150 only engages a portion of the first insulator 112 and a portion of the second insulator 122 along the lengths thereof. For example, the inner surface 152 engages the first insulator 112 along a minority of a circumference of the first insulator 112 and the inner surface 152 engages the second insulator 122 along a minority of a circumference of the second insulator 122. However, the non-conductive buffer layer 150 maintains the spacing of the shield layer 108 to the first insulator 112 and to the second insulator 122, and thus to the first inner conductor 110 and the second conductor 120, respectively. The non-conductive buffer layer 150 increases the distance between the conductors 110, 120 and the shield layer 108 reducing the negative impact of the shield layer 108 on the signal integrity of the electrical cable 100. For example, the presence of the non-conductive buffer layer 150 may reduce the impact of the shield layer 108 by maximizing differential mode of signal propagation. The presence of the non-conductive buffer layer 150 may improve attenuation in the signal conductors from the shield layer 108. The presence of the non-conductive buffer layer 150 may increase the bandwidth of the electrical cable 100 allowing faster data rates to be transmitted by the electrical cable 100.

In an exemplary embodiment, the non-conductive buffer layer 150 has greater flexibility per thickness than the material of the first and second insulators 112, 122. As such, by using the non-conductive buffer layer 150, as opposed to increasing the thicknesses of the insulators 112, 122, the flexibility of the electrical cable 100 for a given cable diameter may be increased and/or the diameter of the electrical cable 100 may be decreased while achieving similar flexibility characteristics. The electrical cable 100 may be limper than cables having thicker insulators 112, 122, making the electrical cable 100 better suited for some applications, such as surgical endoscopy. In an exemplary embodiment, the non-conductive buffer layer 150 has increased pull strength compared to the material of the first and second insulators 112, 122, which may allow the electrical cable 100 to be better adapted for some applications, such as surgical endoscopy, as compared to electrical cables that do not utilize the non-conductive buffer layer 150.

In an exemplary embodiment, the electrical cable 100 is provided without a metal foil layer wrapped around the core. Foil layers tend to add cost and weight to electrical cables. Additionally, foil layers make electrical cables less flexible and tend to degrade over time, such as due to cracking or ripping as the electrical cable is bent and flexed during use. The non-conductive buffer layer 150 is used to provide spacing between the conductor assemblies 102, 104 and the shield layer 108 to enhance the signal integrity of the conductor assemblies 102, 104. The non-conductive buffer layer 150 is flexible allowing the electrical cable 100 to be more limp and appropriate for use in some applications, such as video endoscopy. In an exemplary embodiment, the non-conductive buffer layer 150 is braided and manufactured from a material having high pull strength characteristics, which may improve the reliability and useful life of the electrical cable.

Figure 4:
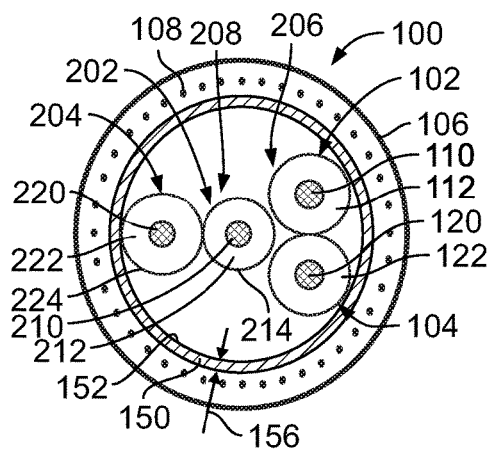
FIG. 4 is a cross-sectional view of the electrical cable in accordance with an exemplary embodiment.
Figure 5:
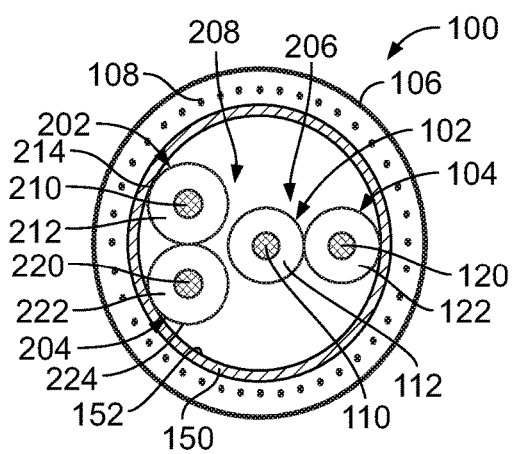
FIG. 5 is a cross-sectional view of the electrical cable in accordance with an exemplary embodiment.
Figure 6:
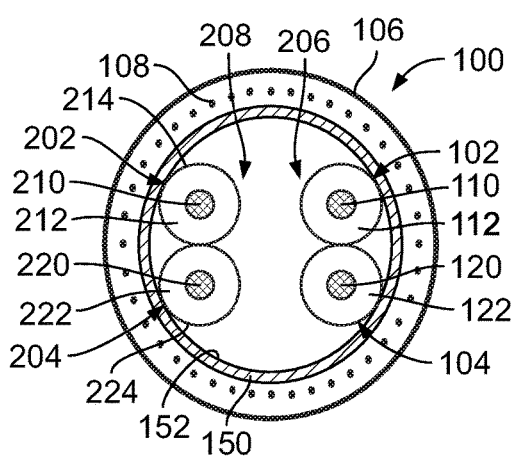
FIG. 6 is a cross-sectional view of the electrical cable in accordance with an exemplary embodiment.

FIG. 4 is a cross-sectional view of the electrical cable 100 in accordance with an exemplary embodiment. FIG. 5 is a cross-sectional view of the electrical cable 100 in accordance with an exemplary embodiment. FIG. 6 is a cross-sectional view of the electrical cable 100 in accordance with an exemplary embodiment. In the embodiments shown in FIGS. 4-6, the electrical cable 100 includes the first conductor assembly 102 and the second conductor assembly 104 and additionally includes a third conductor assembly 202 and a fourth conductor assembly 204. The first and second conductor assemblies 102, 104 form a first twisted pair 206 and the third and fourth conductor assemblies 202, 204 form a second twisted pair 208.

The non-conductive buffer layer 150 surrounds both twisted pairs 206, 208 of conductor assemblies. The shield layer 108 surrounds the non-conductive buffer layer 150 and the outer jacket 106 surrounds the shield layer 108. Other layers or additional twisted pairs may be provided in other alternative embodiments.

The third conductor assembly 202 includes a third inner conductor 210 that is configured to convey data signals, such as video signals and a third insulator 212 surrounding the third inner conductor 210. The inner conductor 210 and insulator 212 extend longitudinally along the length of the electrical cable 100. The inner conductor 210 is formed of a conductive material, such as metal. The insulator 212 engages and surrounds a surface 214 of the inner conductor 210. The insulator 212 is configured to maintain separation between the inner conductor 210 and other components, such as the non-conductive buffer layer 150, the shield layer 108 and/or from other conductors to electrically insulate the inner conductor 210 preventing an electrical short.

The fourth conductor assembly 204 includes a fourth inner conductor 220 that is configured to convey data signals, such as video signals and a fourth insulator 222 surrounding the fourth inner conductor 220. The inner conductor 220 and insulator 222 extend longitudinally along the length of the electrical cable 100. The inner conductor 220 is formed of a conductive material, such as metal. The insulator 222 engages and surrounds a surface 224 of the inner conductor 220. The insulator 222 is formed of a dielectric material. The insulator 222 is configured to maintain separation between the inner conductor 220 and other components, such as the non-conductive buffer layer 150, the shield layer 108 and/or from other conductors to electrically insulate the inner conductor 210 preventing an electrical short.

The inner surface 152 of the non-conductive buffer layer 150 engages and surrounds the first and second insulators 112, 122 of the first and second conductor assemblies 102, 104 and the third and fourth insulators 212, 222 of the third and fourth conductor assemblies 202, 204. The uniform radial thickness 156 of the non-conductive buffer layer 150 controls the positioning of the shield layer 108 relative to the conductor assemblies 102, 104, 202, 204. For example, the non-conductive buffer layer 150 generally positions the shield layer 108 a constant radial distance from the inner conductors 110, 120, 210, 220 to provide consistent electrical properties along the length of the electrical cable 100. As the twisted pairs 206, 208 are twisted along the length of the electrical cable 100, there may be sections of the conductor assemblies 102, 104, 202, 204 that do not engage the non-conductive buffer layer 150. For example, FIG. 4 illustrates the third conductor assembly 202 positioned in the core such that the non-conductive buffer layer 150 is not touching the third insulator 212 and FIG. 5 illustrates the first conductor assembly 102 positioned in the core such that the non-conductive buffer layer 150 is not engaging the first insulator 212; however, along other portions, the first and third insulators 112, 212 the engages the non-conductive buffer layer 150. FIG. 6 illustrates the non-conductive buffer layer 150 engaging all four of the insulators 112, 122, 212, 222. As such, generally along the length of the electrical cable 100, the distances from the inner conductors 110, 120, 210, 220 to the shield layer 108 are approximately equal and consistent.

Figure 7:
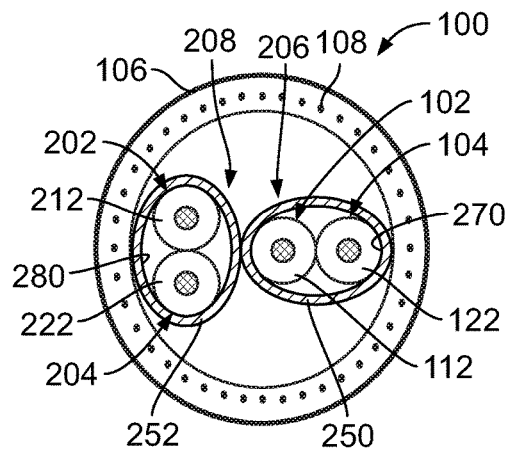
FIG. 7 is a cross-sectional view of the electrical cable in accordance with an exemplary embodiment.
Figure 8:
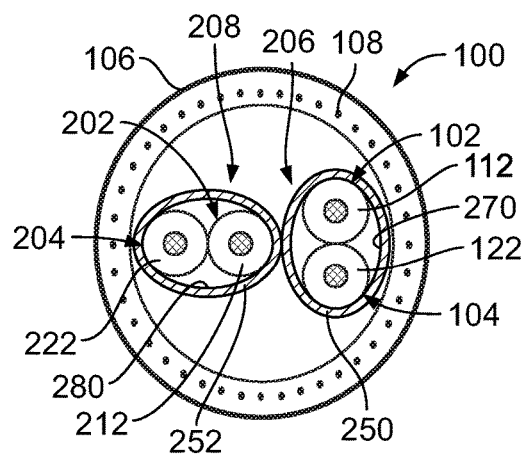
FIG. 8 is a cross-sectional view of the electrical cable in accordance with an exemplary embodiment.
Figure 9:
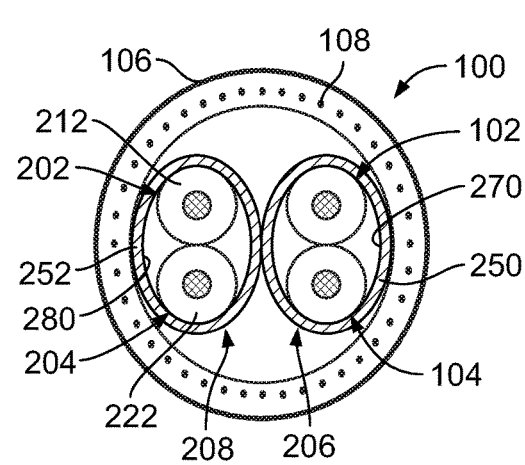
FIG. 9 is a cross-sectional view of the electrical cable in accordance with an exemplary embodiment.

FIG. 7 is a cross-sectional view of the electrical cable 100 in accordance with an exemplary embodiment. FIG. 8 is a cross-sectional view of the electrical cable 100 in accordance with an exemplary embodiment. FIG. 9 is a cross-sectional view of the electrical cable 100 in accordance with an exemplary embodiment. In the embodiments shown in FIGS. 7-9, the electrical cable 100 includes the first twisted pair 206 having the conductor assemblies 102, 104 and the second twisted pair 208 having the conductor assemblies 202, 204.

In an exemplary embodiment, a first non-conductive buffer layer 250 surrounds the first twisted pair 206 and a second non-conductive buffer layer 252 surrounds the second twisted pair 208. The first non-conductive buffer layer 250 engages and surrounds the first and second insulators 112, 122 of the first and second conductor assemblies 102, 104. For example, an inner surface 270 of the first non-conductive buffer layer 250 engages and surrounds the first and second insulators 112, 122. The second non-conductive buffer layer 250 engages and surrounds the third and fourth insulators 212, 222 of the third and fourth conductor assemblies 202, 204. For example, an inner surface 280 of the second non-conductive buffer layer 252 engages and surrounds the third and fourth insulators 212, 222. The shield layer 108 surrounds the non-conductive buffer layers 250, 252. The outer jacket 106 surrounds the shield layer 108. Other layers or additional twisted pairs may be provided in other alternative embodiments.

The uniform radial thickness of the first non-conductive buffer layer 250 controls the positioning of the shield layer 108 relative to the conductor assemblies 102, 104 of the first twisted pair 206. The uniform radial thickness of the second non-conductive buffer layer 252 controls the positioning of the shield layer 108 relative to the conductor assemblies 202, 204 of the second twisted pair 208.

Figure 10:
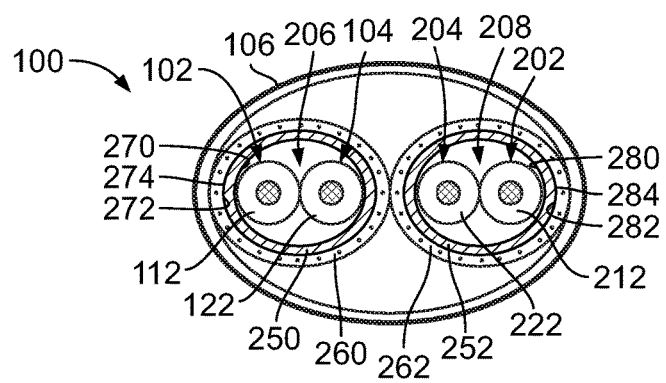
FIG. 10 is a cross-sectional view of the electrical cable in accordance with an exemplary embodiment.

FIG. 10 is a cross-sectional view of the electrical cable 100 in accordance with an exemplary embodiment. The electrical cable 100 includes the first twisted pair 206 having the conductor assemblies 102, 104 and the second twisted pair 208 having the conductor assemblies 202, 204.

In an exemplary embodiment, the first non-conductive buffer layer 250 engages and surrounds the first and second insulators 112, 122 of the first and second conductor assemblies 102, 104 of the first twisted pair 206 and a first conductive shield layer 260 surrounds the first non-conductive buffer layer 250. For example, an inner surface 270 of the first non-conductive buffer layer 250 engages and surrounds the first and second insulators 112, 122 and an inner surface 272 of the first conductive shield layer 260 engages an outer surface 274 of the first non-conductive buffer layer 250. The second non-conductive buffer layer 252 engages and surrounds the third and fourth insulators 212, 222 of the third and fourth conductor assemblies 202, 204 of the second twisted pair 208 and a second conductive shield layer 262 surrounds the second non-conductive buffer layer 252. For example, an inner surface 280 of the second non-conductive buffer layer 252 engages and surrounds the third and fourth insulators 212, 222 and an inner surface 282 of the second conductive shield layer 262 engages an outer surface 284 of the second non-conductive buffer layer 252. The outer jacket 106 surrounds the first and second conductive shield layers 260, 262. Other layers or additional twisted pairs may be provided in other alternative embodiments.

The uniform radial thickness of the first non-conductive buffer layer 250 controls the positioning of the first shield layer 260 relative to the conductor assemblies 102, 104 of the first twisted pair 206. The uniform radial thickness of the second non-conductive buffer layer 252 controls the positioning of the second shield layer 262 relative to the conductor assemblies 202, 204 of the second twisted pair 208.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical cable comprising:
a first conductor assembly that extends along a length of the electrical cable, the first conductor assembly comprising a first inner conductor and a first insulator engaging and surrounding a surface of the first inner conductor;
a second conductor assembly adjacent the first conductor assembly along the length of the electrical cable, the second conductor assembly comprising a second inner conductor and a second insulator engaging and surrounding a surface of the second inner conductor;
a non-conductive buffer layer surrounding the first and second conductor assemblies, the non-conductive buffer layer having an inner surface engaging the first and second insulators and an outer surface opposite the inner surface and comprising braided strands of non-conductive material;
a third conductor assembly that extends along the length of the electrical cable, the third conductor assembly comprising a third inner conductor and a third insulator engaging and surrounding a surface of the third inner conductor;
a fourth conductor assembly that extends along the length of the electrical cable, the fourth conductor assembly comprising a fourth inner conductor and a fourth insulator engaging and surrounding a surface of the fourth inner conductor;
a second non-conductive buffer layer surrounding the third and fourth conductor assemblies, the second non-conductive buffer layer engaging the third and fourth insulators, wherein the shield layer engages and surrounds the second non-conductive buffer layer;
a conductive shield layer engaging and surrounding the outer surface of the non-conductive buffer layer, the shield layer providing electrical shielding for the first and second conductor assemblies; and
an outer jacket engaging and surrounding the conductive shield layer.

2. An electrical cable comprising:
a first conductor assembly that extends along a length of the electrical cable, the first conductor assembly comprising a first inner conductor and a first insulator engaging and surrounding a surface of the first inner conductor;
a second conductor assembly adjacent the first conductor assembly along the length of the electrical cable, the second conductor assembly comprising a second inner conductor and a second insulator engaging and surrounding a surface of the second inner conductor;
a non-conductive buffer layer surrounding the first and second conductor assemblies, the non-conductive buffer layer having an inner surface engaging the first and second insulators and an outer surface opposite the inner surface and comprising braided strands of non-conductive material;
a third conductor assembly that extends along the length of the electrical cable, the third conductor assembly comprising a third inner conductor and a third insulator engaging and surrounding a surface of the third inner conductor;
a fourth conductor assembly that extends along the length of the electrical cable, the fourth conductor assembly comprising a fourth inner conductor and a fourth insulator engaging and surrounding a surface of the fourth inner conductor;

a second non-conductive buffer layer surrounding the third and fourth conductor assemblies, the second non-conductive buffer layer having an inner surface engaging the third and fourth insulators and an outer surface opposite the inner surface;

a conductive shield layer engaging and surrounding the outer surface of the non-conductive buffer layer, the shield layer providing electrical shielding for the first and second conductor assemblies;

a second conductive shield layer engaging and surrounding the outer surface of the second non-conductive buffer layer, the second shield layer providing electrical shielding for the third and fourth conductor assemblies; and an outer jacket engaging and surrounding the conductive shield layer and the second conductive shield layer.

3. The electrical cable of claim 1, wherein the conductive shield layer comprises braided strands of conductive material.

4. The electrical cable of claim 3, wherein the non-conductive buffer layer has M number of picks of braided strands of non-conductive material and the conductive shield layer has N number of picks of braided strands of conductive material different than the M number of picks of braided strands of non-conductive material.

5. The electrical cable of claim 1, wherein the first and second conductor assemblies are electrically connected to a camera at a first end of the electrical cable and the first and second conductor assemblies are electrically connected to a camera control unit at a second end of the electrical cable.

6. The electrical cable of claim 1, wherein the shield layer has a uniform radial thickness around the outer perimeters of the first and second insulators.

7. The electrical cable of claim 1, wherein the non-conductive buffer layer has a uniform thickness between the inner surface and the outer surface to locate the conductive shield layer at a uniform distance from the first and second conductor assemblies.

8. The electrical cable of claim 1, wherein the non-conductive buffer layer comprises braided strands of aromatic polymer material.

9. The electrical cable of claim 1, wherein the non-conductive buffer layer is porous to air.

10. The electrical cable of claim 1, wherein the non-conductive buffer layer has greater flexibility per thickness than the material of the first and second insulators.

11. The electrical cable of claim 1, wherein the non-conductive buffer layer has increased pull strength compared to the material of the first and second insulators.

12. The electrical cable of claim 2, wherein the non-conductive buffer layer is braided around the first and second conductor assemblies.

13. The electrical cable of claim 1, wherein the first and second conductor assemblies are twisted helically around each other along the length of the electrical cable.

14. The electrical cable of claim 1, wherein the inner surface engages the first insulator along a minority of a circumference of the first insulator and the inner surface engages the second insulator along a minority of a circumference of the second insulator.

15. The electrical cable of claim 1, wherein the first and second conductor assemblies define a first twisted pair, the third and fourth conductor assemblies define a second twisted pair, and the conductive shield layer provides electrical shielding for the third and fourth conductor assemblies.

* * * * *